(12) United States Patent
Lee et al.

(10) Patent No.: US 12,535,720 B2
(45) Date of Patent: Jan. 27, 2026

(54) CAMERA MODULE HAVING EMBEDDED ELECTRONIC ELEMENT AND STEEL SHEET FOR IMPROVED HEAT DISSIPATION, AND ELECTRONIC DEVICE HAVING THE SAME

(71) Applicant: TRIPLE WIN TECHNOLOGY(SHENZHEN) CO.LTD., Shenzhen (CN)

(72) Inventors: Ming-Hsun Lee, New Taipei (TW); Yi-Wan Wang, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 69 days.

(21) Appl. No.: 18/237,845

(22) Filed: Aug. 24, 2023

(65) Prior Publication Data
US 2024/0219817 A1 Jul. 4, 2024

(30) Foreign Application Priority Data
Dec. 30, 2022 (CN) .......................... 202223566482.6

(51) Int. Cl.
| | | |
|---|---|---|
| *G03B 17/55* | (2021.01) | |
| *H04N 23/00* | (2023.01) | |
| *H04N 23/52* | (2023.01) | |
| *H04N 23/54* | (2023.01) | |
| *H04N 23/57* | (2023.01) | |
| *H05K 1/02* | (2006.01) | |
| *H05K 7/20* | (2006.01) | |

(52) U.S. Cl.
CPC ............. *G03B 17/55* (2013.01); *H04N 23/00* (2023.01); *H04N 23/52* (2023.01); *H04N 23/54* (2023.01); *H04N 23/57* (2023.01); *H05K 1/021* (2013.01); *H05K 7/2039* (2013.01)

(58) Field of Classification Search
CPC ........ H04N 23/50; H04N 23/51; H04N 23/52; H04N 23/54; H04N 23/57; G03B 17/55; G03B 17/02; G03B 30/00; G03B 2217/00; G03B 2217/002; H05K 1/0201–0212; H05K 5/04; H05K 7/2039–20518; B60R 11/04; G06F 1/1686; H04M 1/0264
See application file for complete search history.

(56) References Cited

U.S. PATENT DOCUMENTS

| | | | |
|---|---|---|---|
| 2018/0241917 A1* | 8/2018 | Zhang | H04N 23/52 |
| 2019/0349507 A1* | 11/2019 | Lee | H04N 23/54 |
| 2019/0373142 A1* | 12/2019 | Fujiwara | H04N 23/54 |
| 2020/0296272 A1* | 9/2020 | Kramarov | H04N 23/52 |
| 2021/0195076 A1* | 6/2021 | Chen | G01S 17/894 |

(Continued)

FOREIGN PATENT DOCUMENTS

CN 105578736 A * 5/2016 .......... H05K 3/0061

*Primary Examiner* — Twyler L Haskins
*Assistant Examiner* — Akshay Trehan
(74) *Attorney, Agent, or Firm* — ScienBiziP, P.C.

(57) ABSTRACT

A camera module includes a circuit board, a photosensitive chip located on a first surface of the circuit board, an electronic element located on a second surface of the circuit board, and a steel sheet located on the second surface. A surface of the steel sheet facing the circuit board defines a groove for receiving the electronic element. A heat conductive paste is located on the electronic element and in contact with the steel sheet.

18 Claims, 5 Drawing Sheets

(56) References Cited

U.S. PATENT DOCUMENTS

| | | | | |
|---|---|---|---|---|
| 2021/0397072 A1* | 12/2021 | Ding | .................... | H05K 1/0203 |
| 2022/0095448 A1* | 3/2022 | Niu | ........................ | H05K 1/181 |
| 2022/0262841 A1* | 8/2022 | Shigeta | ................ | H10F 39/804 |
| 2022/0365406 A1* | 11/2022 | Ye | .......................... | F16M 13/02 |
| 2023/0098815 A1* | 3/2023 | Cho | ....................... | G03B 17/55 |
| | | | | 348/374 |

* cited by examiner

CAMERA MODULE HAVING EMBEDDED ELECTRONIC ELEMENT AND STEEL SHEET FOR IMPROVED HEAT DISSIPATION, AND ELECTRONIC DEVICE HAVING THE SAME

FIELD

The subject matter relates to optical imaging, and more particularly, to a camera module and an electronic device having the camera module.

BACKGROUND

With the miniaturization of electronic devices, the size of camera modules is required to become thinner and shorter. The camera module usually includes a lens component, a circuit board, a photosensitive chip, and an electronic component, and the photosensitive chip and the lens component are located on a same surface of the circuit board. The electronic component is usually set around the photosensitive chip or embedded in the circuit board. When the electronic component is set around the photosensitive chip, the width of the circuit board may be larger. When the electronic component is embedded in the circuit board, the circuit board may need a groove for receiving the electronic component by laser beams. The position accuracy of the groove or the electronic component in the groove may affect the quality of the circuit board. In addition, the heat dissipation of the embedded electronic component is poor.

Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
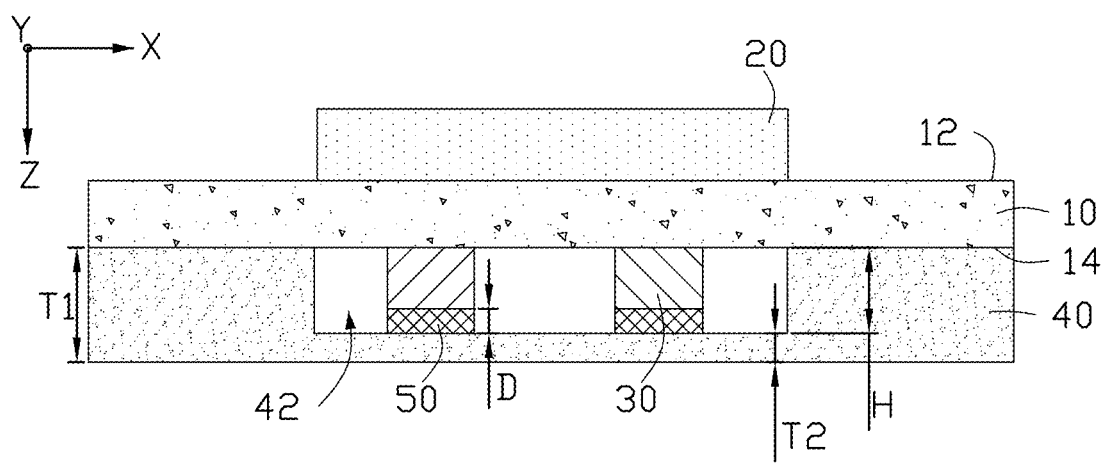
FIG. 1 is a cross-sectional view of a camera module according to an embodiment of the present disclosure.

It will be appreciated that for simplicity and clarity of illustration, where appropriate, reference numerals have been repeated among the different FIG.s to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
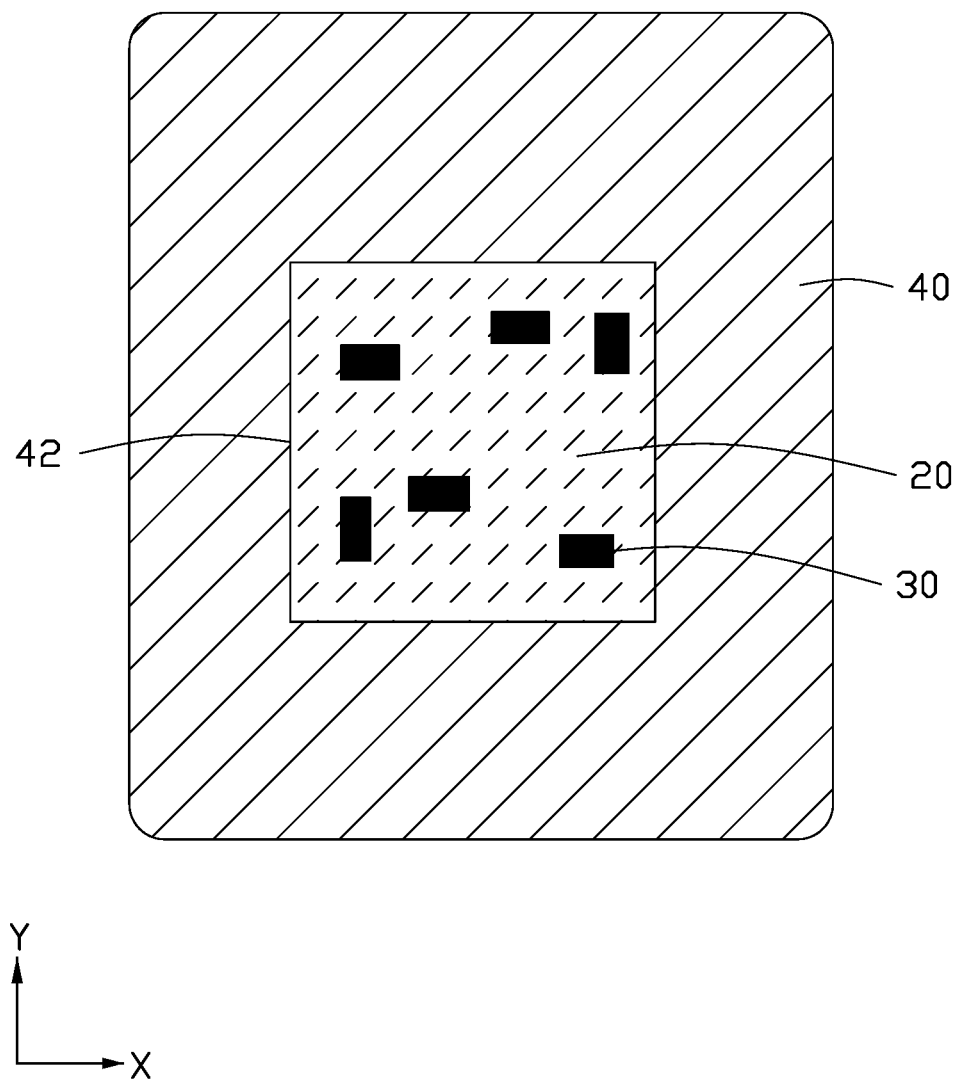
FIG. 2 is a top view of the camera module of FIG. 1.

Referring to FIGS. 1 and 2, a camera module 100 is provided according to an embodiment of the present disclosure. The camera module 100 includes a circuit board 10, a photosensitive chip 20, a plurality of electronic elements 30, and a steel sheet 40. The circuit board 10 has a first surface 12 and a second surface 14 opposite to the first surface 12. The photosensitive chip 20 is located on the first surface 12. The electronic elements 30 and the steel sheet 40 are located on the second surface 14.

A width direction X, a length direction Y, and a thickness direction Z are defined. The width direction X, the length direction Y, and the thickness direction Z are perpendicular to each other. Along the thickness direction Z, a surface of the steel sheet 40 facing the circuit board 10 is recessed to form a groove 42. The electronic elements 30 are received in the groove 42. As such, the camera module 100 and the steel sheet 40 can cooperatively seal and protect the electronic elements 30. The groove 42 corresponds to the photosensitive chip 20 along the thickness direction Z. That is, along the thickness direction Z, an orthogonal projection of the groove 42 on the circuit board 10 corresponds to an orthogonal projection of the photosensitive chip 20 on the circuit board 10. Another surface of the steel sheet 40 away from the circuit board 10 is substantially parallel to the circuit board 10. A heat conductive paste 50 is set between each of the electronic elements 50 and the steel sheet 40. As such, a portion of the heat generated by the electronic elements 30 can be dissipated to the circuit board 10, and another portion of the heat can be dissipated to the heat conductive paste 50. The heat conductive paste 50 is not electrically conductive.

In at least one embodiment, the electronic element 30 may be a capacitor or a resistor. The steel sheet 40 is made of stainless steel. The circuit board 10 may be a rigid circuit board, a flexible circuit board, or a rigid-flexible circuit board.

Figure 3:
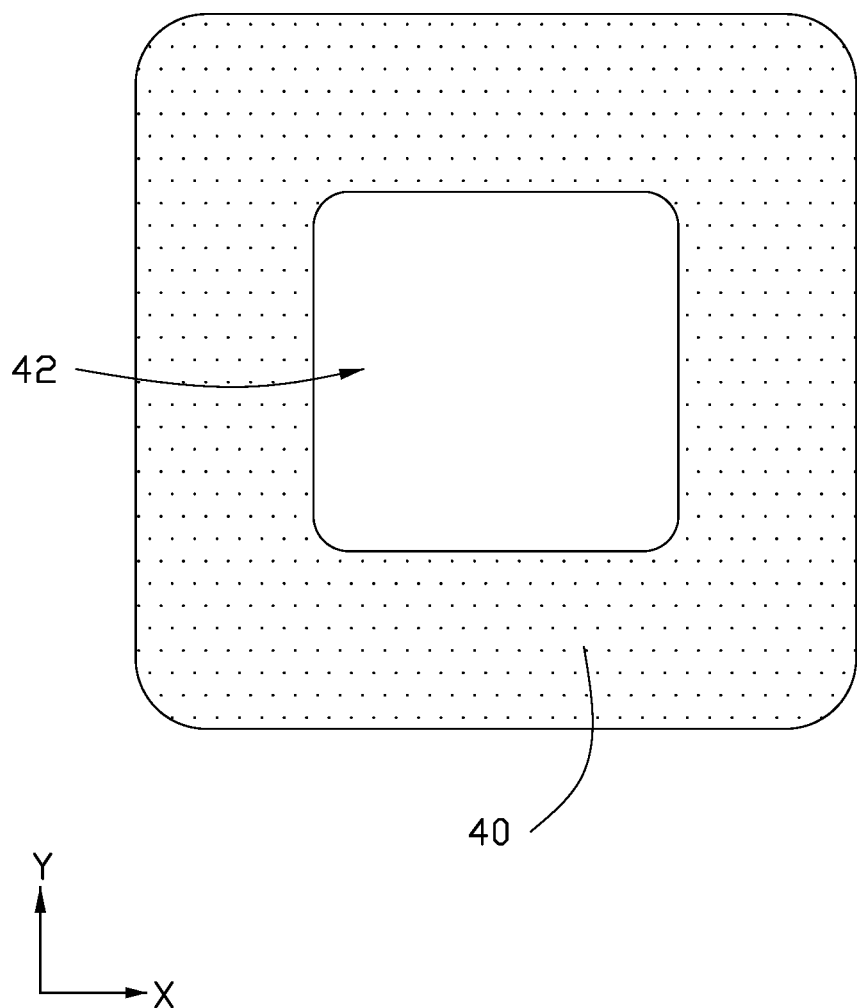
FIG. 3 is a top view of a steel sheet of the camera module of FIG. 2 according to an embodiment of the present disclosure.
Figure 4:
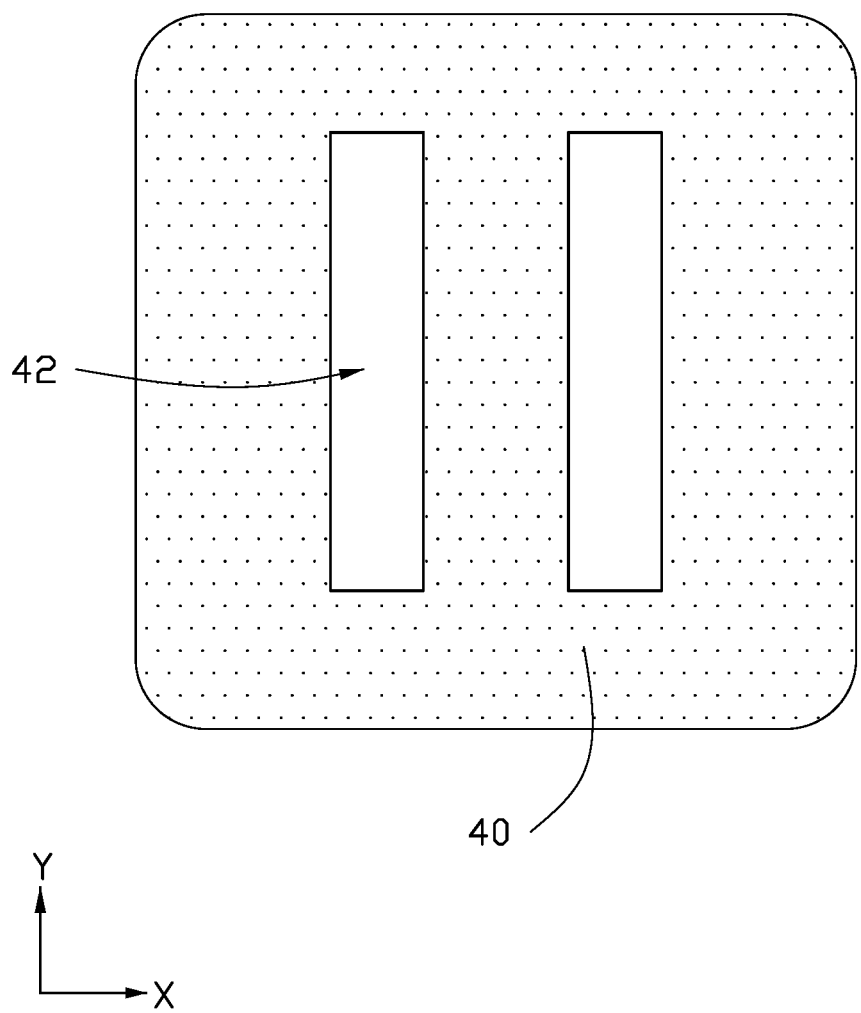
FIG. 4 is a top view of a steel sheet of the camera module of FIG. 2 according to another embodiment of the present disclosure.

Referring to FIG. 3, in at least one embodiment, a cross section of the groove 42 can be rectangular, square, or polygonal. Referring to FIG. 4, in at least one embodiment, the surface of the steel sheet 40 facing the circuit board 10 may define two or more grooves 42. The grooves 42 may be parallel or perpendicular to each other.

The groove 42 can be formed by punching or etching. When the groove 42 is formed by punching, a bottom surface of the groove 42 may be flat. When the groove 42 is formed by etching, the bottom surface of the groove 42 may be inclined with respect to a plane defined by the width direction X and the length direction Y In at least one embodiment, the thickness T1 of the steel sheet 40 besides the groove 42 is about 0.45 mm or 0.33 mm. A depth H of the groove 42 is in a range of 0.25 mm to 0.3 mm. A thickness T2 of the steel sheet 40 corresponding to the groove 42 (that is, a minimum thickness of the steel sheet 40) is in a range of 0.08 mm to 0.15 mm. Along the thickness direction Z, a distance D between the electronic element 30 and the steel sheet 40 is in a range of 0.075 mm to 0.275 mm. In the existing camera module, if the photosensitive chip and the electronic elements are all mounted on the circuit board, considering the width of the photosensitive chip, the width of each electronic element, and a spacing between the photosensitive chip and the electronic element or between two adjacent electronic elements, a surface area of the circuit board along the X-Y plane is at least 5.4 mm*5.4 mm. In the present disclosure, the surface area of the circuit board 10 is only 4.4 mm*4.4 mm. Although the thickness of the steel sheet 40 may be larger (the thickness of the existing steel sheet may only be about 0.1 mm), which may increase the overall thickness of the camera module 100 in the thickness direction Z, the increase of the overall thickness of the camera module 100 allows an electronic device to have improved strength and electromagnetic compatibility (EMC). Thus, the slightly increase of the overall thickness of the camera module 100 may not be considered as a defect.

During manufacturing, the photosensitive chip 20 and the electronic element 30 are set on the circuit board 10, and the surface of each electronic element 30 away from the circuit board 10 is coated with the heat conductive paste 50. Then, the steel sheet 40 with the groove 42 is mounted to the circuit board 10, causing the electronic element 30 to be received in the groove 42.

With the above configuration, it has no need to reserve a space around the photosensitive chip 20 to mount the electronic elements. Thus, the dimensions of the camera module 100 along the width direction X and the length direction Y can be reduced. Moreover, by arranging the heat conductive paste 50 on the electronic element 30, the heat generated by the electronic element 30 can be dissipated through the circuit board 10 and the steel sheet 40, so the heat dissipation effect can be improved. The manufacturing method of the camera module 100 is simple, the requirements for position accuracy are low, which can reduce cost and improve yield.

Figure 5:
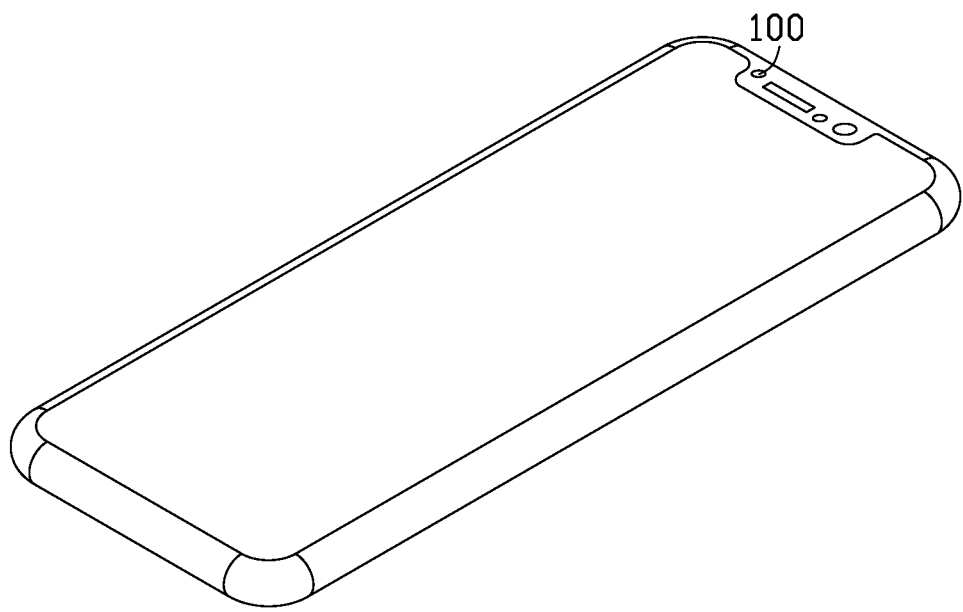
FIG. 5 is a block diagram of an electronic device according to an embodiment of the present disclosure.

Referring to FIG. 5, an electronic device 200 is also provided according to an embodiment of the present disclosure. The electronic device 200 includes a casing and the camera module 100 mounted on the casing. The electronic device 200 may be a mobile phone, a tablet computer, a notebook computer, or a wearable device.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A camera module comprising:
a circuit board comprising a first surface and a second surface away from the first surface;
a photosensitive chip located on the first surface;
at least one electronic element located on the second surface;
a steel sheet located on the second surface, wherein a surface of the steel sheet facing the circuit board defines at least one groove, the at least one electronic element is received in the at least one groove; and
a heat conductive paste located on the at least one electronic element, and the heat conductive paste being in contact with the steel sheet;
wherein inner sidewalls of the at least one groove are aligned with outer sidewalls of the photosensitive chip.

2. The camera module according to claim 1, wherein the heat conductive paste connects the at least one electronic element to the steel sheet.

3. The camera module according to claim 1, wherein a surface of the steel sheet away from the circuit board is parallel to the second surface.

4. The camera module according to claim 1, wherein the at least one groove comprises a plurality of grooves parallel to each other.

5. The camera module according to claim 1, wherein a cross section of each of the at least one groove is rectangular, square, or polygonal.

6. The camera module according to claim 1, wherein a thickness of the steel sheet is 0.45 mm or 0.33 mm, and a thickness of the steel sheet corresponding to the groove is in a range of 0.08 mm to 0.15 mm.

7. The camera module according to claim 6, wherein a distance between the at least one electronic element and the steel sheet is in a range from 0.075 mm to 0.275 mm.

8. The camera module according to claim 1, wherein the steel sheet is made of stainless steel.

9. The camera module according to claim 1, wherein each of the at least one electronic element is a capacitor or a resistor.

10. An electronic device comprising:
a casing; and
a camera module mounted to the casing, the camera module comprising:
a circuit board comprising a first surface and a second surface away from the first surface;
a photosensitive chip located on the first surface;
at least one electronic element located on the second surface;
a steel sheet located on the second surface, wherein a surface of the steel sheet facing the circuit board defines at least one groove, the at least one electronic element is received in the at least one groove; and
a heat conductive paste located on the at least one electronic element, and the heat conductive paste being in contact with the steel sheet;
wherein inner sidewalls of the at least one groove are aligned with outer sidewalls of the photosensitive chip.

11. The electronic device according to claim 10, wherein the heat conductive paste connects the at least one electronic element to the steel sheet.

12. The electronic device according to claim 10, wherein a surface of the steel sheet away from the circuit board is parallel to the second surface.

13. The electronic device according to claim 10, wherein the at least one groove comprises a plurality of grooves parallel to each other.

14. The electronic device according to claim 10, wherein a cross section of each of the at least one groove is rectangular, square, or polygonal.

15. The electronic device according to claim 10, wherein a thickness of the steel sheet is 0.45 mm or 0.33 mm, and a thickness of the steel sheet corresponding to the groove is in a range of 0.08 mm to 0.15 mm.

16. The electronic device according to claim 15, wherein a distance between the at least one electronic element and the steel sheet is in a range from 0.075 mm to 0.275 mm.

17. The electronic device according to claim 10, wherein the steel sheet is made of stainless steel.

18. The electronic device according to claim 10, wherein each of the at least one electronic element is a capacitor or a resistor.

* * * * *